(12) United States Patent
Schiff

(10) Patent No.: US 7,639,646 B2
(45) Date of Patent: Dec. 29, 2009

(54) SATELLITE DIVERSITY SYSTEM, APPARATUS AND METHOD

(75) Inventor: Leonard N. Schiff, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 548 days.

(21) Appl. No.: 10/882,964

(22) Filed: Jun. 30, 2004

(65) Prior Publication Data

US 2005/0207375 A1    Sep. 22, 2005

Related U.S. Application Data

(60) Provisional application No. 60/554,222, filed on Mar. 17, 2004.

(51) Int. Cl.
*H04W 4/00* (2009.01)
*H04B 7/185* (2006.01)

(52) U.S. Cl. .................. 370/331; 455/12.1; 455/427

(58) Field of Classification Search .................. None
See application file for complete search history.

(56) References Cited

U.S. PATENT DOCUMENTS

| | | | |
|---|---|---|---|
| 5,796,760 A | | 8/1998 | Wiedeman et al. |
| 5,841,766 A | * | 11/1998 | Dent et al. .................. 370/321 |
| 6,138,012 A | * | 10/2000 | Krutz et al. .................. 455/427 |
| 6,314,269 B1 | | 11/2001 | Hart et al. |
| 6,567,645 B1 | * | 5/2003 | Wiedeman et al. ......... 455/12.1 |

FOREIGN PATENT DOCUMENTS

| | | |
|---|---|---|
| EP | 0837568 | 4/1998 |
| WO | 0205457 | 1/2002 |

OTHER PUBLICATIONS

OA dated Dec. 24, 2008 for Korean Patent Application 10-2006-7021424, 6 pages (English and Korean Translations).
OA mailed Nov. 27, 2007 for Australian Patent Application No. 2005223266, 3 pages.
OA mailed Apr. 7, 2009 for Australian Patent Application No. 2005223266, 2 pages.
OA mailed Apr. 17, 2008 for Russian Patent Application No. 2006136424, 2 pages.

* cited by examiner

*Primary Examiner*—Erika A Gary
(74) *Attorney, Agent, or Firm*—Turocy & Watson, LLP

(57) ABSTRACT

Communication diversity using a plurality of satellites is disclosed. The satellites can support multiple regions corresponding to multiple satellite beams. Each satellite can support all regions in the reverse direction and each satellite can be designated as a primary satellite for one of the multiple regions corresponding to one of the multiple satellite beams. Each satellite can receive from any of the regions reverse link signals broadcast by, for example, a mobile station. Each satellite can communicate the received reverse link signals to, for example, a base station or gateway where the signals can be combined to increase signal quality. A mobile station receives forward link signals from the primary satellite and monitors a signal quality from the primary satellite and from a secondary satellite. If the signal quality from the primary satellite drops below a threshold value, the communication signal is transferred to the secondary satellite.

27 Claims, 5 Drawing Sheets

SATELLITE DIVERSITY SYSTEM, APPARATUS AND METHOD

CROSS-REFERENCES TO RELATED APPLICATIONS

This application claims the benefit of U.S. Provisional Application No. 60/554,222, filed Mar. 17, 2004; entitled METHOD AND APPARATUS FOR PROVIDING SATELLITE DIVERSITY, which is hereby incorporated herein by reference in its entirety.

BACKGROUND OF THE DISCLOSURE

Communication satellites provide communication support for a wide region. Typically the supported region is an area on the surface of the earth that lies within the beam of a satellite that is directed towards the earth. The region can be relatively stationary such as when the communication satellite is a geostationary satellite. The region may vary over time such as when the communication satellite is a low earth orbit (LEO) satellite. Some systems may require numerous satellites each having multiple beams. Other communication systems may use a single satellite covering a wide coverage area in a single beam. For example, a communication system may use a single communication satellite having a beam that covers a region that includes the entire continental United States.

The reliability of a satellite is of utmost concern because communication satellites often are used to provide critical communication links. The remote nature of a communication satellite combined with the extended period of time needed to put a replacement satellite into space makes the satellite a single point whose failure can bring down communication channels for an extended period of time. To alleviate the single point failure nature of a communication satellite, communication system designers often provide an in-orbit spare satellite in order to maintain the communication channels in case the operating satellite fails. The spare satellite is not normally used for communications, but is used to provide system redundancy. If the operational satellite should fail, the communications are switched to the in-orbit spare in order to maintain communications. The failed satellite can then be repaired or decommissioned. Another in-orbit spare can then be placed into space to provide a redundant communication satellite.

In satellite communication systems where a single communication satellite can support a region as large as the continental United States, the in-orbit spare represents a large system cost that provides a disproportionately small benefit. It would be advantageous to reduce the system burden of a dormant in-orbit spare.

BRIEF SUMMARY OF THE DISCLOSURE

A system, apparatus and method for communication diversity using a plurality of satellites is disclosed. The satellites can support multiple regions corresponding to multiple satellite beams. Each satellite can support all regions in the reverse direction and each satellite can be designated as a primary satellite for one of the multiple regions corresponding to one of the multiple satellite beams.

In the reverse link direction from, for example, a mobile station to the satellite, each satellite can receive from any of the regions reverse link signals broadcast by the mobile station. Each satellite can communicate the received reverse link signals to, for example, a base station or gateway where the signals can be combined to increase signal quality.

In the forward link direction, the base station or gateway broadcasts a signal to a satellite that can be relayed to the mobile station. A mobile station receives forward link signals from the primary satellite and monitors a signal quality from the primary satellite and from a secondary satellite. If the signal quality from the primary satellite drops below a threshold value, the communication signal is transferred to the secondary satellite.

In one aspect, the disclosure includes a satellite diversity system including a first satellite configured to provide a first beam as a primary beam supporting a first region, a second satellite configured to provide a second beam as a secondary beam supporting a region substantially overlapping the first region, and a ground station. The ground station is configured to transmit a signal to the first region via the first satellite during a period of time when a communication path through the first satellite is not degraded, and configured to transmit the signal to the first region via the second satellite during the period of time that the communication path through the first satellite is degraded.

In another aspect, the disclosure includes a satellite diversity system including a gateway transceiver configured to selectively transmit a forward link signal to one or both of a first satellite and a second satellite, a quality of service module coupled to the gateway transceiver and configured to determine if a communication path through the first satellite is degraded, and a link control module coupled to the quality of service module and configured to control the gateway transceiver to transmit the forward link signal to the first satellite to be relayed to a mobile station if the communication path through the first satellite is not degraded, and configured to control the gateway transceiver to transmit the forward link signal to the second satellite to be relayed to the mobile station if the communication path through the first satellite is degraded.

In still another aspect, the disclosure includes a satellite diversity system including a first satellite having a first beam providing coverage for a first region and a second beam providing coverage for a second region, the first satellite configured as a primary satellite for the first region and a secondary satellite for the second region, a second satellite having a first beam providing coverage for a third region that substantially overlaps the first region and a second beam providing coverage for a fourth region that substantially overlaps the second region, the second satellite configured as a primary satellite for the fourth region and a secondary satellite for the third region, and a ground station configured to transmit a first signal to a first mobile station in an overlapping portion of the first and third regions via the first satellite when a signal metric reported by the first mobile station is greater than a predetermined threshold, and configured to transmit the first signal to the first mobile station via the second satellite when the signal metric is not greater than the predetermined threshold.

In yet another aspect, the disclosure includes a method of providing satellite diversity. The method includes transmitting a signal to a receiver positioned in a first geographic region using a first satellite, determining if a communication link from the first satellite to the receiver is degraded, and transmitting the signal to the receiver using a second satellite if the communication link from the first satellite is degraded.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

Figure 1B:
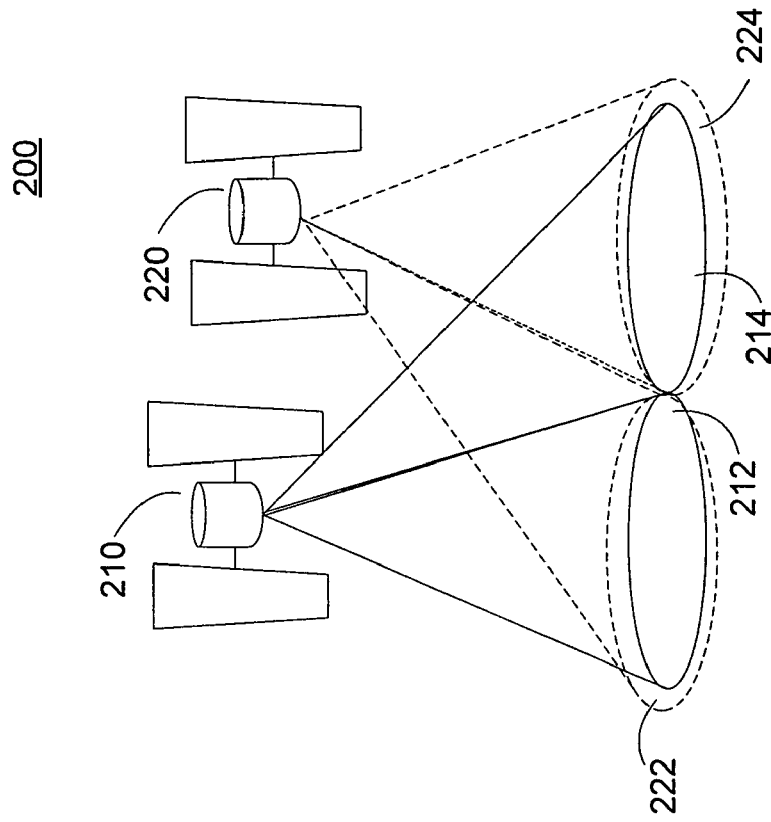
FIGS. 1A-1B are functional diagrams of satellites having one or more beams configured to provide area coverage.

The disclosed system and method of providing diversity in a satellite communication system can use a plurality of satellites, each satellite having multiple beam patterns providing communication support for a corresponding number of regions. Each satellite can be configured to be a primary communication satellite for at least one of the regions supported by the multiple beams. The beams and satellites are typically allocated such that each beam within the aggregate service area has a satellite assigned as the primary satellite for that beam. Additionally, for each of the beams, a satellite different from the primary satellite is assigned as a secondary satellite for the region supported by the beam.

The satellite communication system can implement different signal processing depending on the communication link direction. A forward link direction typically refers to a communication link from a stationary base station or gateway to a mobile station, and may occur via the satellite. A reverse link direction typically refers to a communication link from the mobile station to the base station or gateway, and may also occur via the satellite.

In the reverse link, each satellite can receive signals from mobile stations in one or more of the beams, including beams covering regions for which the satellite is not designated as the primary satellite. The satellites can then transmit the reverse link communication to the base station or gateway. The base station or gateway can combine the signals to increase the signal quality. If the reverse link signal from one of the mobile stations to one satellite is occluded or somehow degraded, the reverse link signal will likely be transmitted by another satellite, ensuring a communication link between the mobile station and the base station or gateway. The likelihood is low that all of the reverse link signals will be degraded to the extent that the base station or gateway is not able to recover the reverse link communication.

In the forward link direction, the base station or gateway transmits the forward link signal to one or more satellites. The primary satellite assigned to the region having the mobile station relays the forward link signal to the mobile station. Typically, the other satellites do not transmit the forward link signals to the regions for which the satellite is not designated the primary satellite. However, the satellites may continue to transmit overhead channels, which may include pilot, sync, and paging channels, to regions where the satellites are not designated as primary satellites.

A mobile station receiving the forward link transmissions may determine a signal quality of the received signal. The mobile station may also determine the signal quality of one or more of the overhead channels transmitted by the non-primary satellites. The mobile station may report signal quality values back to the base station or gateway. For example, the mobile station may report the signal quality values as part of a power control loop.

If the forward link signal transmitted by the primary satellite is degraded, such as by an obstruction or a degradation in the satellite, the mobile station can report the degraded signal quality to the base station. The base station can determine, based in part on the signal quality values, if the signal quality transmitted by the primary satellite has degraded below an acceptable level. The base station can configure the secondary satellite, or one or more of the non-primary satellites, to broadcast the forward link signal to the mobile station if the signal quality from the primary satellite is no longer acceptable. Thus, the base station can configure a satellite to broadcast a forward link signal in a beam for which the satellite is not the primary satellite. The secondary satellite can be configured to provide a relatively high probability of availability. Therefore, if the forward link signal from the primary satellite is occluded or otherwise degraded, the system can switch the forward link signal to the secondary satellite and have a high likelihood that the communication link will remain connected.

Figure 1A:
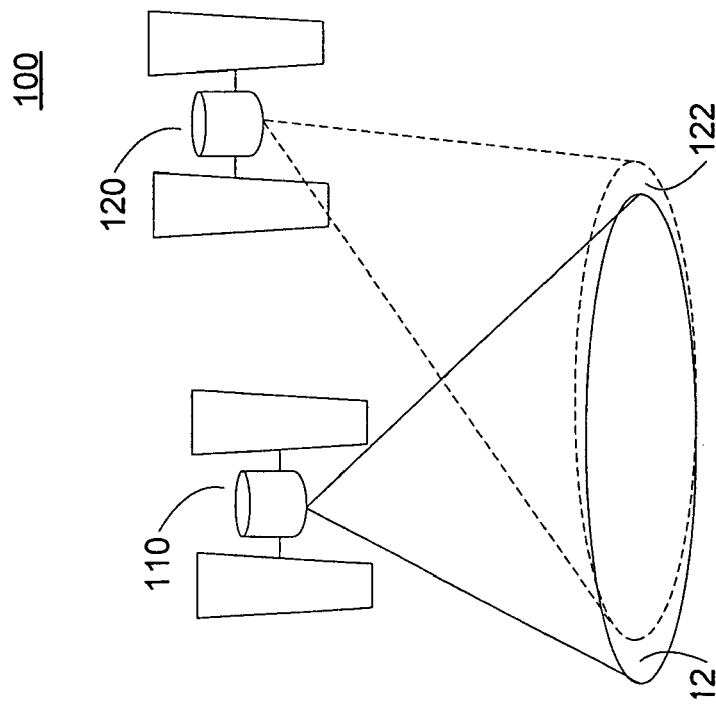

FIG. 1A is a functional diagram of the satellite configuration of a prior art satellite communication system 100. The system 100 includes a first communication satellite 110 that is configured to provide coverage for a region 112 corresponding to a beam of an antenna radiation pattern. In some embodiments, the beam may substantially illuminate a region as large as the continental United States. Although shown as a single beam, it is generally understood that a beam can be implemented as a plurality of beams collectively illuminating a region substantially equivalent to a larger region. Thus, the beam from the first communication satellite 110 can include a plurality of beams providing support for the region 112.

A second communication satellite 120 is configured as an in-orbit spare. The second communication satellite 120 is configured to provide coverage for a second region 122 that substantially overlaps the first region 112 supported by the first communication satellite 110.

During normal operations, the first communication satellite 110 is configured to complete the communication links for all communication channels in the system 100. The second communication satellite 120 remains dormant or otherwise inactive as an in-orbit spare. As noted earlier, the second communication satellite 120 is used to assure coverage in case of a failure of the first communication satellite 110. If the first communication satellite 110 should fail, the second communication satellite 120 could be activated to continue providing support for communications.

FIG. 1B is a functional block diagram of the satellite configuration of a communication system 200 in which multiple satellites provide for system redundancy while improving the quality of the communication links supported by the system 200. The system 200 includes a first communication satellite having first and second beams that respectively illuminate first and second regions 212 and 214. The system 200 also includes a second communication satellite 220 having first and second beams that respectively illuminate first and second regions 222 and 224. In one embodiment, the first and second regions 212 and 214 supported by the first satellite 210 substantially overlap the first and second regions 222 and 224 supported by the second satellite 220. As noted earlier, any of the beams may include one or more beams configured to illuminate the region.

Unlike the prior art system shown in FIG. 1A, the communication system 200 of FIG. 1B uses both satellites 210 and 220 to support communication links. The first communication satellite 210 can be configured to receive reverse link signals from its supported regions 212 and 214 and relay them to one or more ground stations (not shown). Similarly, the second communication satellite 220 can be configured to receive reverse link signals from its supported regions 222 and 224 and relay them to one or more ground stations (not shown), which may in some cases include one or more ground stations communicating with the first communication satellite 210.

In the forward link direction, each of the communication satellites 210 and 220 is designated as a primary satellite for one or more of the regions. In one embodiment, the first communication satellite 210 can be designated the primary satellite for the first region 212 and can be designated a secondary satellite for the second region 214. Similarly, the second communication satellite 220 can be designated the primary satellite for the second region 224 and a secondary satellite for the first region 222. Therefore, the second communication satellite 220 serves as the secondary satellite for the region 212 where the first communication satellite 210 is the primary satellite. Similarly, the first communication satellite 210 serves as the secondary satellite for the region 224 where the second communication satellite 220 is the primary satellite.

The primary satellite transmits strong overhead signals to the region for which it is designated the primary satellite and transmits a weaker overhead signal to the region for which the satellite is designated the secondary satellite. The overhead signals can include, for example, pilot, paging, and sync channels.

Under typical operating conditions, the primary satellite transmits the forward link signal to the region for which it is the primary satellite and does not transmit traffic signals destined for the regions for which the satellite is not the primary satellite. Thus, for a given region, a primary satellite transmits strong overhead signals and transmits traffic channels to receivers within the region. A secondary satellite transmits weaker overhead signals to the region, but ordinarily does not transmit traffic channels to the region.

However, if a receiver in a region experiences a loss of signal quality, for example, due to a loss of signal strength from the primary satellite, the system 200 can switch or otherwise transfer the communication link to the secondary satellite. Therefore, when a communication link from a primary satellite is degraded, the communication link can be switched to or otherwise transferred to a secondary satellite providing coverage to the region. The communication link can be transferred back to the primary satellite when the communication link from the primary satellite recovers from the degraded condition.

In one embodiment, the first communication satellite 210 can have two beams that illuminate the continental United States. A first region 212 can be, for example, the western continental United States and a second region 214 can be, for example, the eastern continental United States. The second communication satellite 220 can be configured to have two beams that illuminate regions that substantially overlap the regions of the first communication satellite 210. Thus, the first region 222 of the second communication satellite 220 can cover the western continental United States and can substantially overlap the first region 212 of the first communication satellite 210. The second region 224 of the second communication satellite 220 can cover the eastern United States and can substantially overlap the second region 214 of the first communication satellite.

The first communication satellite 210 can be configured to be the primary satellite for the eastern United States and can be the secondary satellite for the western United States. The second communication satellite 220 can be configured to be the primary satellite for the western United States and can be the secondary satellite for the eastern United States.

In the reverse link direction, both the first and second communication satellites 210 and 220 can receive transmissions from both of the regions and can relay the signals to the appropriate ground stations. In the forward link direction, the first communication satellite 210 transmits relatively strong overhead signals to its second region 214. The first communication satellite 210 also transmits the traffic channels to its second region 214. The second communication satellite 220 transmits relatively weak overhead signals to its second region 224 and does not transmit traffic channels to its second region 224 unless the forward link signal from the first communication satellite 210 is degraded.

In this embodiment, forward link operation in the western United States is similar except the second communication satellite 220 broadcasts the stronger overhead signals and takes primary responsibility for the traffic channels. The first communication satellite 210 broadcasts relatively weaker overhead signals and transmits to the region those traffic channels switched to it due to degraded conditions on the second communication satellite 220.

Using the above described embodiment, each of the satellites can be configured to operate as in-orbit spares for the other satellite, while providing communication benefits not available in a dormant spare satellite system. As both satellites approach one-half loading, a third satellite can be placed into orbit as a dormant spare, or may be integrated into the system 200 using additional beam assignments. The additional satellite can be used to ensure that full traffic can continue if one satellite fails. This is similar to the conventional approach having a single satellite and an inactive in-orbit spare, where at least one additional satellite is needed when the communication load approaches the limit of the single active satellite.

Although the embodiment shown in FIG. 1B shows two satellites 210 and 220 with each satellite having two beams, other embodiments can use more than two satellites and each satellite can have more than two beams. For example, a system may include three satellites and each of the satellites can have a plurality of beams. Each satellite can be configured to be a primary satellite for one or more of the regions supported by the plurality of beams. Typically, each region has one primary satellite. Each satellite can also be configured to be a secondary satellite for one or more regions supported by the plurality of beams for which the satellite is not configured to be a primary satellite. In some embodiments, more than one satellite can be designated as secondary satellites for a particular region. In other embodiments, each region has one of the multiple satellites configured as a secondary satellite. In still other embodiments, the satellites can be ranked in a hierarchy, such that a region is supported by multiple satellites in the order of the hierarchy.

Figure 2:
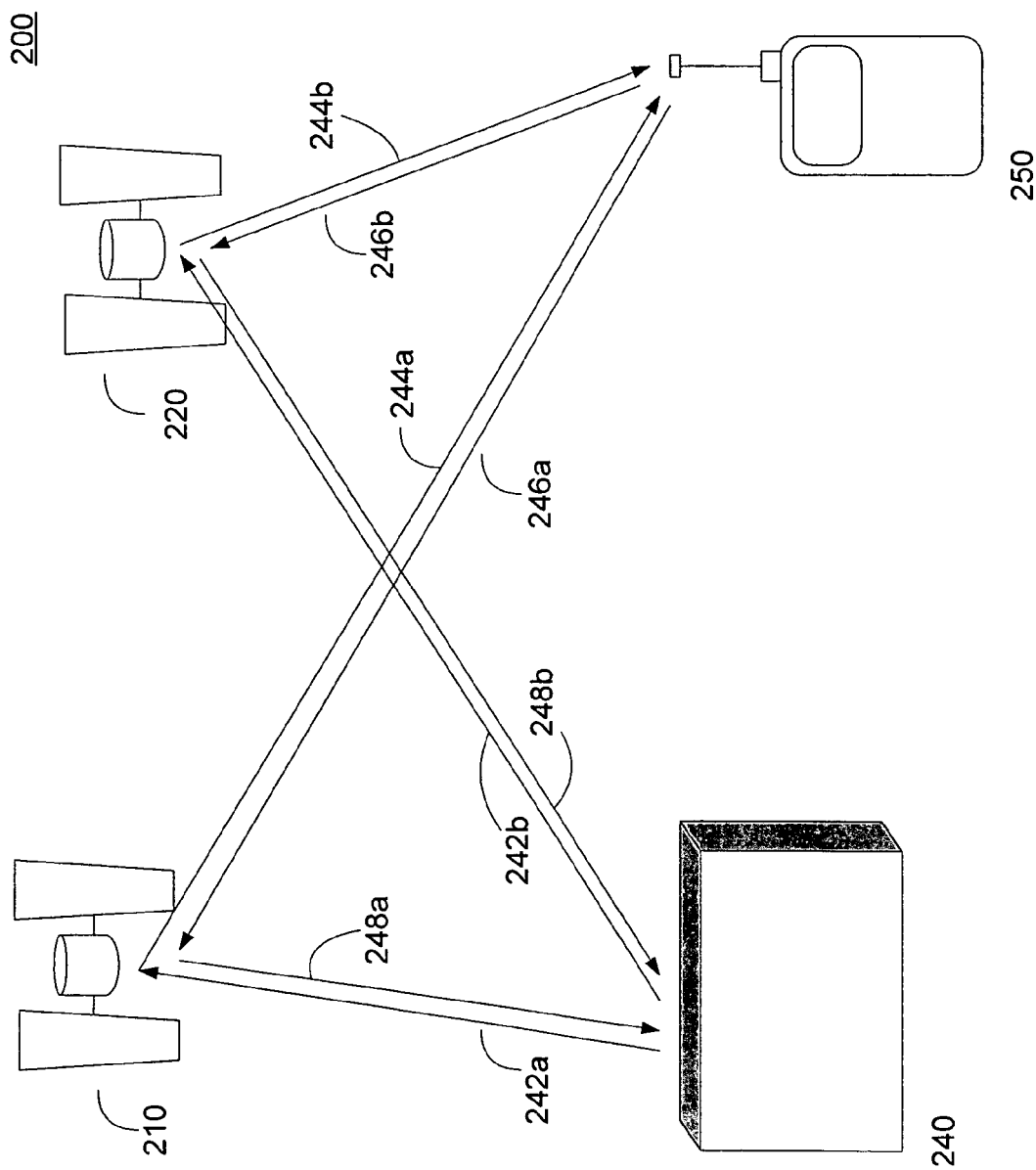
FIG. 2 is a functional block diagram of an embodiment of a satellite diversity system.

FIG. 2 is a more detailed functional block diagram of a communication system 200 showing multiple satellites configured to provide redundant communication links to a region. The system 200 shown in FIG. 2 can be, for example, the same as the system shown in FIG. 1B. Although multiple regions may be supported by the system, a single region is shown for the purposes of clarity.

The communication system 200 of FIG. 2 can be, for example, a satellite telephone system, a satellite data communication system, such as a computer network having satellite links within the network, and the like, or some other type of communication system. The communication system 200 can include a first communication satellite 210 operating as a primary satellite and a second communication satellite 220 operating as a secondary satellite. In this embodiment, the term primary refers to the satellite's designation as the primary satellite for the region shown in FIG. 2. Similarly, the term secondary refers to the satellite's designation as the secondary satellite for the region shown in FIG. 2. A satellite that is the primary satellite for one region may be a secondary satellite for another region. Similarly, a satellite that is the secondary satellite for a region may be a primary satellite for another region. The satellites 210 and 220 can be, for example, geostationary satellites, medium earth orbit satellites, low earth orbit satellites, or satellites in some other orbit.

The system 200 also includes a ground station 240 that may be, for example, a base station, gateway, and the like, or some other system apparatus for interfacing with a ground communication system. The system 200 may include multiple ground stations 240. Only one ground station 240 is shown for the sake of brevity. The ground station 240 can provide the interface between the satellites 210 and 220 and the remainder of the communication system (not shown). For example, where the communication system 200 is a telephone system, the ground station 240 can be a satellite gateway that interfaces to a mobile controller and Public Switched Telephone Network (PSTN). In other embodiments, the ground station 240 can be an Internet gateway that interfaces the satellite communications to a network, such as the Internet.

The system 200 can include one or more mobile stations 250, although only one is shown in FIG. 2. The mobile station 250 can be, for example, a portable telephone, portable communication device such as a notebook computer or personal digital assistant, a fixed wireless device, and the like, or some other communication device.

In the embodiment shown in FIG. 2, communications between the ground station 240 and the mobile station 250 may occur over one or more satellite links. In the reverse link direction, each communication satellite 210 and 220 receives the signal from all beams and relays these signals to the ground station 240 where they can be combined. The mobile station 250 typically transmits the reverse link signals using a broad beam antenna that permits the signal to be transmitted or received simultaneously from multiple satellites.

The first communication satellite 210 relays a first reverse link signal 246a from the mobile station 250 as a first satellite reverse link signal 248a to the ground station 240. The second communication satellite 220 relays a second reverse link signal 246b from the mobile station 250 as a second satellite reverse link signal 248b to the ground station 240. The ground station 240 can then combine the satellite reverse link signals 248a and 248b to improve the signal to noise ratio (SNR) of the reverse link signal.

Diversity combining in the reverse direction essentially provides a "free" benefit as the signal from the mobile station 250 reaches the satellites 210 and 220 regardless of whether the satellite relays the signal to the ground station 250. The satellites 210 and 220 use a negligible amount of power to relay the reverse link signals 248a-b to the ground station 240. Combining the signals at the ground station 240 can provide up to 3 dB more SNR, assuming equal strength signals reach the satellites 210 and 220. The improvement can be 3 dB for signaling protocols such as Code Division Multiple Access (CDMA) 2000 where the ground station 240 or some subsequent signal processing stage can perform coherent combining. The improvement can be approximately 1.8 dB gain if non-coherent combining is used.

In other embodiments, the satellites 210 and 220 and the ground station 240 can be configured to receive multiple polarizations, for example Left Hand Circular (LHC) and Right Hand Circular (RHC) or vertical and horizontal, for diversity combining at the ground station 240. The satellites 210 and 220 may be configured to receive and relay multiple signal polarities in order to extract every bit of power out of the signal.

Combining the reverse link signals 248a-b from both satellites 210 and 220 costs the system 200 almost nothing in power. However, signal combining in the reverse link direction provides up to a 3 dB gain in SNR if neither signal is blocked. Satellite diversity is achieved such that if one reverse link signal path is blocked the communication link can continue over the redundant link. In some embodiments, the system 200 may direct the mobile station 250 using a power control technique to increase the mobile station 250 transmit power in order to restore the SNR if one link is lost.

In one embodiment, the system 200 can operate the forward link in a manner similar to the reverse link. The ground station 240 can transmit forward link signals 242a-b to both satellites 210 and 220 and the satellites 210 and 220 can relay the forward link signals 244a-b to the mobile station 250. The mobile station 250 can then individually track the forward link signals 244a-b and combine them at the mobile station 250.

However, in the forward direction there is a tradeoff between power and diversity. It may be advantageous for the system 200 to implement diversity for the condition where one of the paths is suddenly blocked. The forward link embodiment that mirrors the reverse link signaling can accomplish diversity by configuring both satellites 210 and 220 to illuminate the mobile station 250. However, such an embodiment requires increased satellite power.

Each satellite 210 and 220 typically cannot be configured to supply only one-half the power radiated by a single satellite configuration. Providing one-half the power in each satellite 210 and 220 would result in the same total power over both satellites compared to a single satellite transmitting the signal. However, in multiple satellite configurations, each satellite has to transmit considerable more than one-half the power of an equivalent signal satellite system.

Each satellite 210 and 220 typically needs to be configured to transmit greater than one-half the power of an equivalent single satellite system because the signal from each satellite, for example 210, represents an interference signal for the signal transmitted by the other satellite, for example 220. For example, a mobile station 250 receiving both signals in a CDMA based system, has separate fingers of a RAKE receiver receiving one of the reverse link signals. Each finger of the RAKE receiver sees the other signal as interference. Thus, the diversity gain of multiple simultaneous forward link satellite signals comes at the cost of more satellite power.

Another embodiment of the system 200 of FIG. 2 capitalizes on the benefits of diversity gain yet uses very little more power in the satellites 210 and 220. In the embodiment, one of the satellites, for example 210, takes primary responsibility for providing service to a given region on the ground, which may represent a cell of a cellular communication system. The two satellites 210 and 220 can divide the communication responsibilities with each taking primary responsibility for half the cells.

The primary satellite, here the first communication satellite 210, communicates the overhead signals to the region. The overhead signals can include, for example, pilot, paging, and sync (PPS) channels. The sync channel can include, for example, a timing reference signal, and a paging channel can include, for example, control signaling messages directed to the mobile station 250. The satellite configured as the primary satellite, for example the first communication satellite 210, can be configured to transmit the overhead signals with much greater power than is typically required to complete the communication link to the mobile station 250 in a clear or unblocked condition. For example, the first communication satellite 210 can be configured to transmit the PPS signals as relatively strong signals. To ensure a robust link, the first communication satellite 210 can be configured to transmit relatively strong PPS signals that are elevated approximately 5-10 dB over the minimum power level required to complete a communication link with the mobile station 250. Of course, the first communication satellite 210 is not limited to transmitting at an elevated level that is 5-10 dB above the minimum power level, but may be configured to transmit at a level that is greater than the minimum power level by a predetermined link margin. The predetermined link margin may be a static level or may vary. For example, the value of the link margin may vary over time. The link margin may be set to, for example, 5 dB, 6 dB, 7 dB, 8 dB, 9 dB, or 10 dB. The primary satellite can be configured to transmit the signals at a relatively strong level that is above the minimum link requirement such that there is a high likelihood the mobile station 250 can receive the signals through obstructions.

The secondary satellite, here the second communication satellite 220, is also configured to transmit the overhead pilot, paging and sync (PPS) signals to the region. However, the overhead PPS signals on the secondary satellite need not be transmitted at an elevated level. In one embodiment, the overhead signals from the second communication satellite 220 can be transmitted at as low as one decibel or two decibel above the minimum link requirement in order to allow for Rician fading. In another embodiment, the second communication satellite 220 can be configured to transmit the PPS signals at a level sufficient to provide a 90% reliability. The two satellites 210 and 220 covering the region can be configured, for example, to use different spreading codes.

If the mobile station 250 is able to receive signals from both satellites 210 and 220, the communication link such as a call is set up on the primary satellite 210 using its paging channel. The forward link traffic channel is set up using the primary satellite, here the first communication satellite 210. If none of the communication links from the primary satellite to the associated mobile station 250 is blocked, then the power on the secondary satellite remains the relatively small PPS power. Therefore the signals from the secondary satellite, here the second communication satellite 220, contributes little interference at the mobile station 250 to the forward link signal from the first communication satellite 210. However, if the mobile station 250 communicating on the traffic channel over the first communication satellite 210 experiences sufficiently high blockage, the communication link can be transferred to the secondary satellite.

Figure 3:
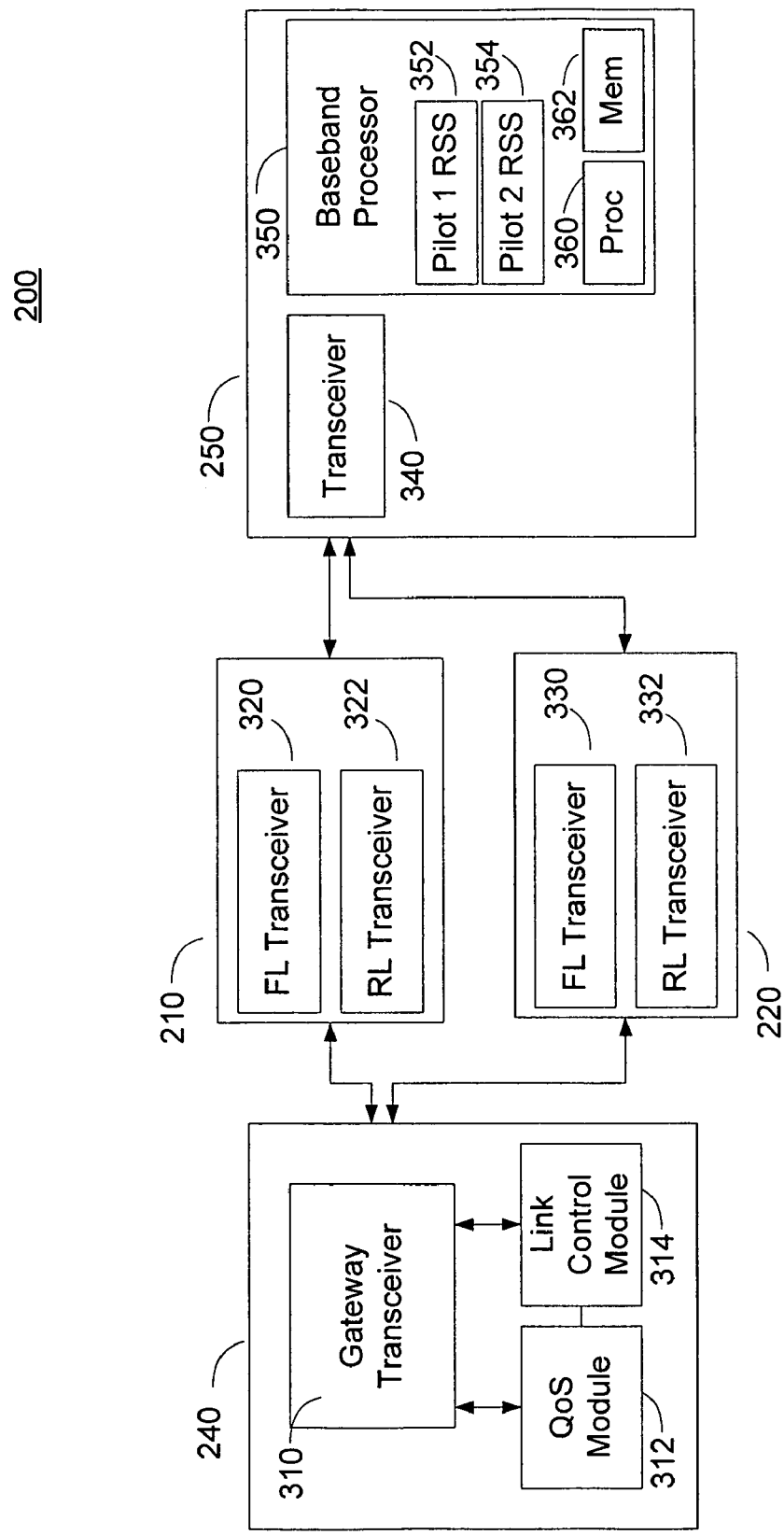
FIG. 3 is a functional block diagram of an embodiment of a satellite diversity system.

FIG. 3 is a functional block diagram of an embodiment of the communication system 200 and can represent the communication system 200 of FIG. 2. As shown in previous functional block diagram, the communication system 200 includes a ground station 240 in communication with a first communication satellite 210 and a second communication satellite 220. The two satellites 210 and 220 are also in communication with a mobile station 250. The number of ground stations 240, satellites 210 and 220, and mobile stations 250 are not limited by the numbers shown in the functional diagram. A minimal number of system 200 elements are shown for ease of discussion.

The ground station 240 can include a gateway transceiver 310 configured to communicate over the forward and reverse links with the satellites 210 and 220. The ground station 240 can also include a quality of service (QoS) module 312 configured to determine a quality of service indication or value corresponding to the communication links to the mobile station 250. For example, the QoS module 312 can be configured to determine a signal metric from a signal transmitted by the mobile station 250 that is indicative of the signal quality received from the satellites 210 and 220. The QoS module 312 can communicate the signal metric or a signal determined from the signal metric to a link control module 314.

The link control module 314 can be configured to determine, based in part on the signal metric, which satellite 210 or 220 is to be configured to transmit the forward link signal to the mobile station 250. The link control module 314 can be configured to control the gateway transceiver 310 to transmit the forward link signal to the mobile station 250 using the primary or secondary satellite. In one embodiment, the link control module 314 can be configured to set a flag or indicator that informs the gateway transceiver 310 of the satellite to use. In another embodiment, the link control module 314 can be configured to provide an address to the gateway transceiver 310 that directs the forward link communication to the desired satellite. The gateway transceiver 310 may transmit the forward link signal to multiple satellites 210 and 220, but the signal may be relayed by the desired satellite based on contents of the transmitted signal. In still other embodiments, the link control module 314 may communicate the desired satellite to the gateway transceiver 310 in some other manner.

Each of the satellites 210 and 220 can be, but are not required to be, configured similarly. The first communication satellite 210 can include a forward link transceiver 320 configured to receive the forward link signals from the ground station 240 and relay them to the desired mobile station 250 in the desired region. The first communication satellite 210 can also include a reverse link transceiver 322 configured to receive reverse link communications transmitted by the mobile station 250 in any supported region and relay them to the ground station 240. The second communication satellite 220 similarly can include a forward link transceiver 330 and a reverse link transceiver 332.

The mobile station 250 can include a mobile transceiver 340 that is configured to receive the forward link signals transmitted by the satellites 210 and 220. The mobile transceiver 340 can be configured to convert the received forward link signals to baseband signals that are processed by a baseband processor 350. The mobile transceiver 340 can also be configured to receive baseband signals from the baseband processor and convert the baseband signals to reverse link signals that are transmitted to the satellites 210 and 220.

The baseband processor 350 can include one or more modules configured to determine the quality of the forward link signals received from the satellites 210 and 220. In one embodiment, the baseband processor 350 can include a first received signal strength indicator (RSSI) module 352 configured to determine a signal strength of the forward link pilot signal from the first communication satellite 210. The baseband processor 350 can also include a second RSSI module 354 configured to determine a signal strength of the forward link pilot signal from the second communication satellite 220. The baseband processor 350 can also include a processor 360 and memory 362. The processor 360 in conjunction with one or more processor readable instructions stored in memory 362 can perform some or all of the functions of the RSSI modules 352 and 354.

The mobile station 250, using the RSSI modules 352 and 354, monitors the received pilot signals and determines a signal quality such as a RSSI. The mobile station 250 can report the RSSI values back to the ground station 240. In one embodiment, the mobile station 250 reports the RSSI values back to the ground station 240 using one or more of the overhead channels. For example, the mobile station 250 can be configured to transmit the RSSI values on a paging channel that is transmitted from the mobile station 250 over the satellites 210 and 220 to the ground station 240. The ground station 240 can compare the received RSSI values against predetermined thresholds and determine if the forward link communication should be transferred to the secondary satellite. Because the satellites 210 and 220 can be configured to transmit different pilot power levels to the same region, the predetermined thresholds may be different from the first satellite 210 and the second satellite 220.

If the pilot strength report indicates that the primary path has slight attenuation, the communication can still continue on the primary satellite. The ground station 250 can be configured to keep the secondary satellite largely free of traffic in part to reduce its interference contribution to signals from the primary satellite. At the point at which the RSSI value reported for the primary satellite no longer exceeds the predetermined threshold, the system 200 may determine that the blockage or degradation of the primary path is large enough such that the power to overcome the degradation becomes excessive. Once this threshold is reached, the communication can be transferred to the secondary satellite that is used to provide an alternative signal path.

Control signaling to transfer the communication link can take place from the traffic channel on the primary link or, if degradation is particularly high, using a secondary paging channel. In a system 200 embodiment where the satellites 210 and 220 are geostationary satellites, the transition may not be seamless. In a geostationary system there may be a ½ second round trip communication delay. Therefore, it may take 1-2 seconds to transfer the communication between satellites. It is not necessary to elevate the power of the overhead channels on the secondary satellite because the secondary satellite is typically used for clear communication paths. If the primary path is blocked or otherwise heavily attenuated and the secondary path is blocked or lightly attenuated the communication link may drop.

Because the secondary satellite channel has a relatively weak overhead signaling and a few light traffic channels there is hardly any interference effect felt on receivers of signals from the primary satellite. This gives the advantage of satellite diversity without paying the high power needed of a system using simultaneous transmission by multiple satellites.

Figure 4:
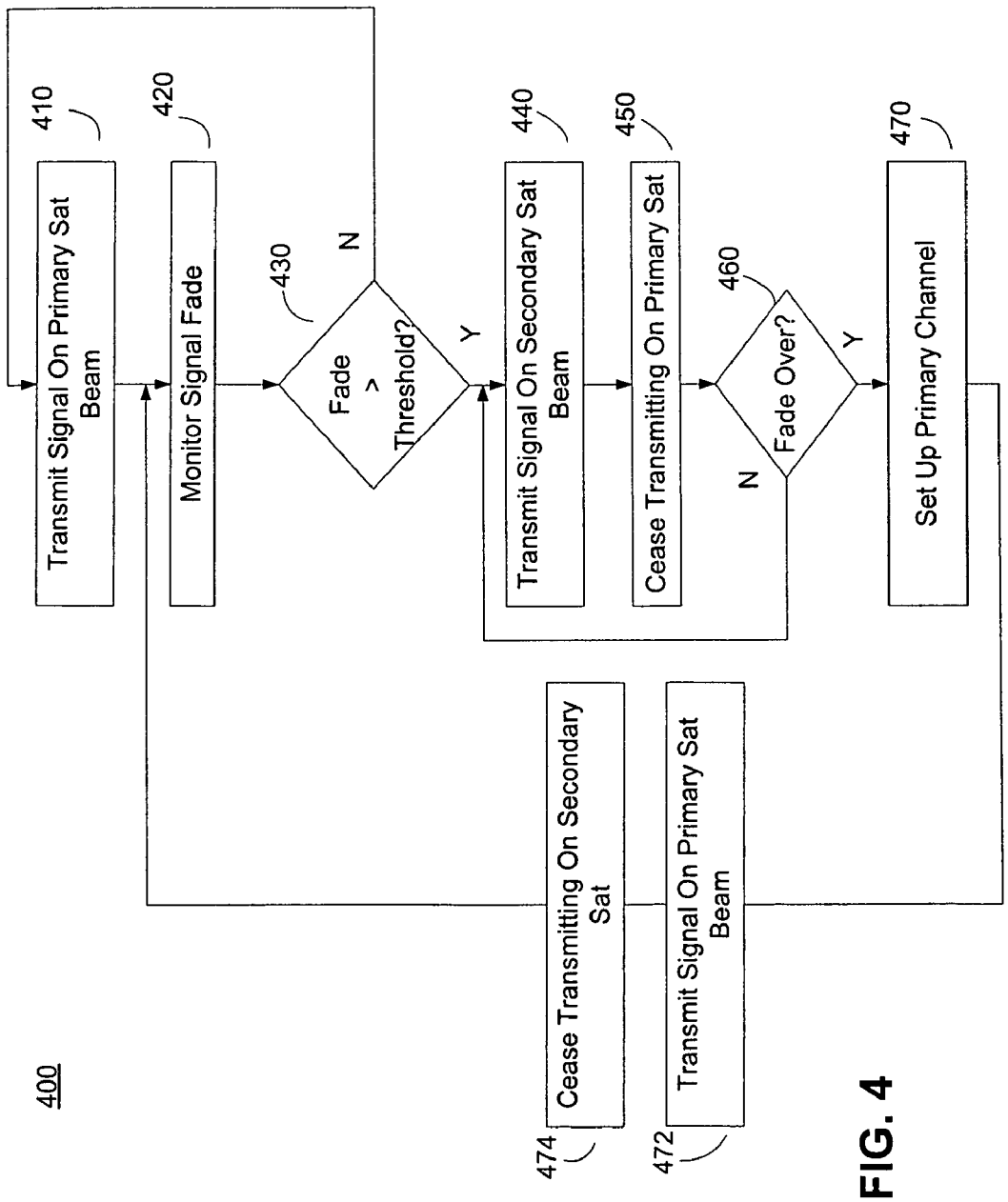
FIG. 4 is a flowchart of an embodiment of a method of providing satellite diversity.

FIG. 4 is a flowchart of an embodiment of a method 400 of providing satellite diversity. The method 400 can be implemented, for example, in the system 200 of FIG. 3. The method 400 begins at block 410 after the initial communication link is set up on a traffic channel of the primary satellite.

At block 410 the system transmits the signal to the mobile station over the traffic channel of the primary satellite. The system proceeds to block 420 and monitors for signal fade. As noted above, the mobile station can be configured to monitor the signal quality of the forward link paths from the multiple satellites. In one embodiment, the mobile station can be configured to determine the RSSI values of the primary and secondary pilot signals. The mobile station can then be configured to report the values back to the ground station in a reverse link overhead message, such as in a power control message reported on a paging channel.

The system proceeds to decision block 430 to determine if the fade exceeds a predetermined threshold. In one embodiment, a QoS module in the ground station compares the reported RSSI values to predetermined thresholds. The RSSI corresponding to the primary satellite can be compared against a first threshold value and the RSSI value from the secondary satellite can be compared against a second predetermined threshold. The system may determine that the primary satellite path is fading or otherwise attenuated based in part on the comparison of the RSSI of the primary satellite to the corresponding threshold. If the RSSI does not exceed the threshold, the system may determine a fade has occurred. Provided the RSSI of the secondary satellite is above its threshold the communication link can successfully be transferred to the secondary satellite.

If the system determines that a fade has not occurred, the system returns to block 410 and continues to support the communication link using the primary satellite. However, if in decision block 430 the system determines that the fade is greater than an acceptable threshold the system proceeds to block 440.

In block 440 the system transfers the communication link to the secondary satellite. The mobile station can be informed of the transfer using, for example, control signaling that is included on the traffic channel of the primary satellite prior to the transfer or on a paging channel of the secondary satellite. The system begins transmitting the traffic channel signal using the secondary communication satellite. The system proceeds to block 450 and ceases transmitting the traffic channel on the primary satellite.

Once the system has transferred the communication link to the secondary path, the system may allow the communication to continue over the secondary link until the link is terminated, for example, by a user of the mobile station. However, in order to maintain minimal traffic loading on the secondary link, the system may be configured to transfer the communication link back to the primary satellite when the primary path recovers from a degraded condition.

The system proceeds to decision block 460 to determine if the fade condition experienced by the primary path has diminished. In decision block 460, the system can compare the RSSI values reported by the mobile stations against the predetermined thresholds. If the system determines that the RSSI value of the primary path does not exceed the predetermined threshold, the system may return to block 440 and continue to support the communication link over the secondary satellite.

Returning to decision block 460, if the system determines that the RSSI value of the primary path has returned to an acceptable value, such as when the RSSI value exceeds the predetermined threshold, the system may determine that the fade condition is over. The system can proceed from decision block 460 to block 470. The system proceeds to transfer the communication link back to the primary satellite. As before, the system can use control signaling to inform the mobile station of the change in the communication link. At block 470 the system sets up the primary channel to carry the forward link signal. After setting up the primary channel, the system proceeds to block 472 and transmits the signal on the primary satellite beam. The system then proceeds to block 474 where the system ceases transmitting on the secondary satellite. The system then returns to block 420 and continues to monitor for a signal fade. The system can continue to perform the method 400 until the communication link is terminated, for example, by the user of the mobile station or by a user or system communicating with the mobile station.

Figure 5:
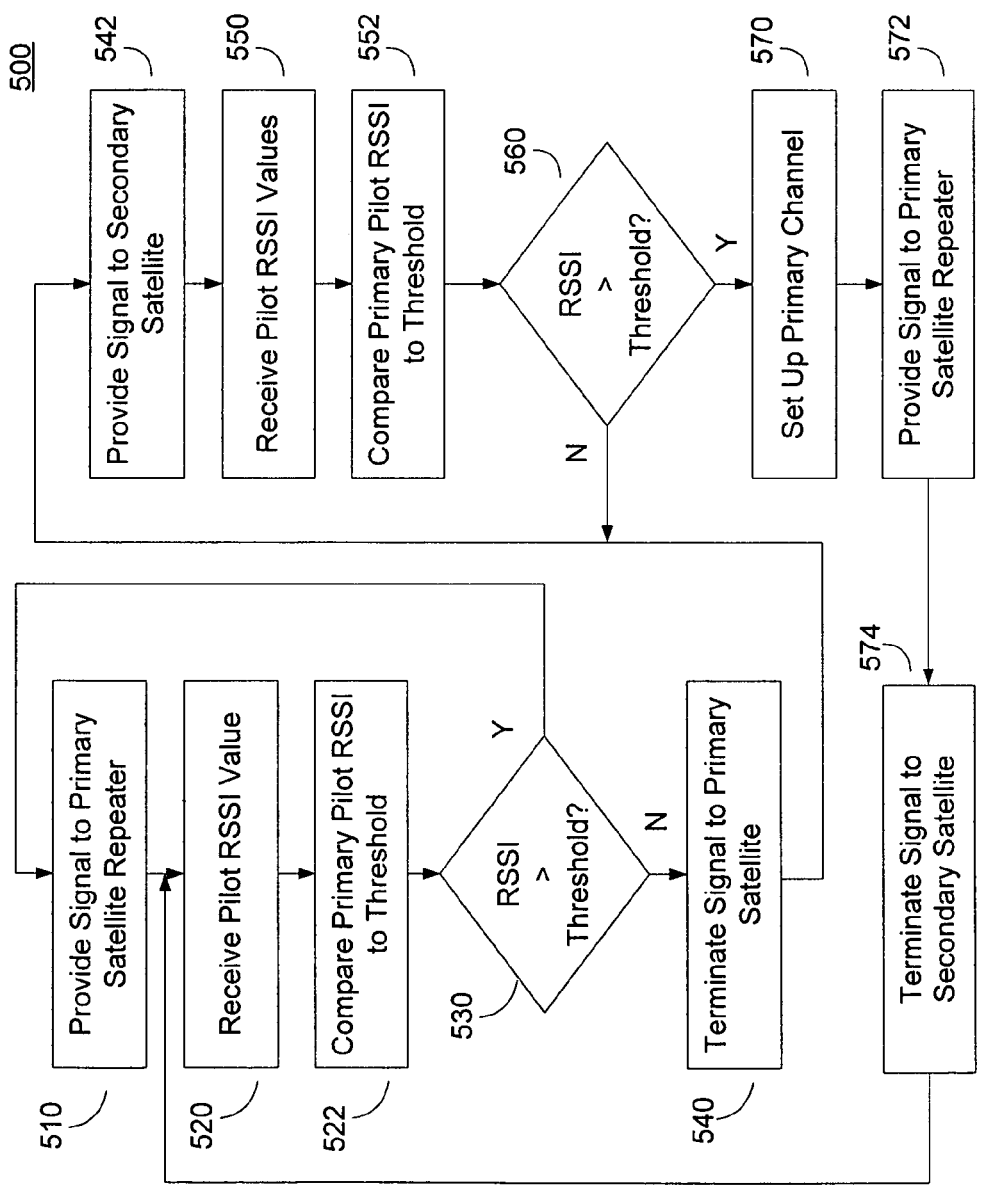
FIG. 5 is a flowchart of an embodiment of a method of providing satellite diversity.

FIG. 5 is a flowchart of a method 500 of providing satellite diversity. The method 500 can be performed, for example, by the ground station of the communication system of FIG. 3.

The method 500 begins at block 510 where the ground station provides the forward link signal to the primary satellite, which may be a primary satellite repeater. The ground station proceeds to block 520 and receives the pilot RSSI values reported by the mobile station.

The ground station proceeds to block 522 and compares the received RSSI values to the predetermined thresholds. At decision block 530, the ground station determines if the primary RSSI is greater than the threshold. If it is, the ground station returns to block 510 and continues to transmit the signal to the primary satellite.

Returning to decision block 530, if the RSSI is not greater than the threshold, the ground station proceeds to block 540 and stops transmitting to the primary satellite. The ground station proceeds to block 542 and begins transmitting to the secondary satellite. In other embodiments, the ground station may make the communication link with the secondary satellite before breaking the link with the primary satellite.

The ground station then proceeds to block 550 and receives the pilot RSSI values from the mobile station. At block 552 the ground station compares the received RSSI values to the thresholds. The ground station proceeds to block 560 to determine if the primary communication path can sustain the communication link. If not, the ground station proceeds back to block 542 and continues to transmit to the secondary satellite.

Returning to decision block 560, if the ground station determines that the RSSI value exceeds the threshold the ground station proceeds to block 570 and sets up the primary channel for transmission over the primary satellite. The ground station then proceeds to block 572 and provides the signal to the primary satellite for transmission. The ground station proceeds to block 574 and terminates transmitting to the secondary satellite. The ground station proceeds back to block 520 and receives the pilot RSSI that is an indicator of the quality of the communication link. The ground station continues to perform the method 500 until the communication link drops or is other wise terminated.

A system and method of satellite diversity is disclosed. The disclosed systems and methods allow for diversity in a satellite communication system by incorporating system functionality in multiple satellites. In one embodiment, two satellites are used and each satellite functions as an in-orbit spare for the other satellite. Each satellite supports two beams and the beams of the satellites illuminate regions that substantially overlap. Each satellite is a primary satellite for one of the beams and is the secondary satellite for the other beam. The primary beam of the first satellite corresponds to a region which corresponds with the secondary beam of the second satellite.

The system is able to achieve reliable communications by setting up communications on the primary satellite and transferring communications to the secondary satellite when the communication path over the primary satellite is degraded. The secondary satellite is minimally loaded because it carries relatively weaker overhead signals and carries traffic channels that correspond to degraded primary communication links. Thus, the secondary satellite contributes a minimal interference signal to the primary communication link.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Persons of ordinary skill in the art may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. ground station configured for operation in a satellite diversity system including:

a plurality of satellites including a first satellite from the plurality of satellites configured to provide a first beam as a primary beam, supporting a first region, and a second beam supporting a third region simultaneously substantially overlapping a second region;

a second satellite from the plurality of satellites configured to provide a first beam as a secondary beam supporting the second region, and a second beam supporting a fourth region simultaneously substantially overlapping the first region;

the ground station configured to:

transmit a forward link traffic signal to the first region via the first satellite during a period of time when a communication path through the first satellite is not degraded;

transmit the forward link traffic signal to the first region via the second satellite during the period of time that the communication path through the first satellite is degraded;

receive signal metrics relating to the forward link traffic signal from a device and determine based at least in part on the signal metrics whether the communication path through first satellite is degraded;

direct the device to vary transmit power to maintain a reverse link signal with at least the first satellite and the second satellite from the plurality of satellites;

receive at least a first reverse link signal from the first satellite and a second reverse link signal from the second satellite; and combine the first and second reverse link signals.

2. The system of claim 1, wherein the first satellite is further configured to transmit a first overhead signal at a signal power that is at least a predetermined link margin above a minimum power level required to establish a link with the device in the first region; and wherein the second satellite is further configured to transmit a second overhead signal that is at a signal power at least greater than the minimum power level required to establish the link with the device in the first region.

3. The system of claim 2, wherein the predetermined link margin is greater than or equal to 5 dB.

4. The system of claim 2, wherein the second satellite is configured to transmit the second overhead signal at a signal power that is at least 1 dB greater than the minimum power level.

5. The system of claim 2, wherein the first overhead signal comprises a first pilot signal.

6. The system of claim 2, wherein the second overhead signal comprises a second pilot signal.

7. The system of claim 1, wherein the ground station is further configured to transmit an additional signal to the second region via the second satellite during a period of time when a communication path through the second satellite is not degraded, and configured to transmit the signal to the second region via the first satellite during the period of time that the communication path through the second satellite is degraded.

8. The system of claim 1, wherein the signal metrics comprise Received Signal Strength Indication (RSSI) values determined by the device in the first region of a first overhead signal transmitted by the first satellite and a second overhead signal transmitted by the second satellite.

9. The system of clam 8, wherein the first and second overhead signals comprise, respectively, first and second pilot signals.

10. A satellite diversity system comprising:
a forward link transceiver within a satellite, configured to receive a first forward link signal from a ground station and transmit the first forward link signal in a first satellite beam corresponding to a first region for which the satellite is designated from a plurality of satellites as a primary satellite, and farther configured to receive a second forward link signal from the ground station and transmit the second forward link signal in a second satellite beam corresponding to a second region for which the satellite is designated from the plurality of satellites as a secondary satellite, the second region simultaneously substantially overlapping a region for which another satellite is designated to provide primary support; and a reverse link transceiver within the satellite configured to receive reverse link signals associated with the first and second forward link signals from at least the first and second regions, and configured to transmit the reverse link signals to the ground station;

wherein the satellite is designated as a primary satellite in response to one or more signal metrics relating to the forward link signal sent from a device within the first region to the ground station, and wherein the satellite is designated as a primary satellite based at least in part on the signal metrics received by the ground station from the device; and wherein the ground station is configured to direct the device to vary transmit power to maintain a reverse link signal with at least the first satellite and the second satellite from the plurality of satellites; receive at least a first reverse link signal from the first satellite and a second reverse link signal from the second satellite; and combine the first and second reverse link signals.

11. The system of claim 10, wherein the forward link transceiver is further configured to transmit in the first satellite beam a first overhead signal at a signal power that is at least a predetermined link margin above a minimum power level, and wherein the forward link transceiver is further configured to transmit a second overhead signal in the second satellite beam at a signal power less than the signal power of the first overhead signal.

12. The system of claim 11, wherein the predetermined link margin is greater than or equal to 5 dB.

13. A satellite diversity system comprising:
a gateway transceiver configured to selectively transmit a forward link signal to one or both of a first satellite and a second satellite from a plurality of satellites and further configured to receive signal metrics relating to the forward link signal from a device; direct the device to vary transmit power to maintain a reverse link signal with at least the first satellite and the second satellite from the plurality of satellites; receive at least a first reverse link signal from the first satellite and a second reverse link signal from the second satellite; and combine the first and second reverse link signals;

a quality of service module coupled to the gateway transceiver and configured to determine if a communication path through the first satellite is degraded, based at least, in part on the signal metrics; and a link control module coupled to the quality of service module and configured to control the gateway transceiver to transmit the forward link signal to the first satellite to be relayed to the device if the communication path through the first satellite is not degraded, and configured to control the gateway transceiver to transmit the forward link signal to the second satellite to be relayed to the device if the communication path through the first satellite is degraded.

14. The system of claim 13, wherein the gateway transceiver is configured to perform coherent combining of the first and second reverse link signals.

15. The system of claim 13, wherein the quality of service module is configured to determine if the communication path through the first satellite is degraded based at least in part on signal metrics received by the gateway transceiver in reverse link signals.

16. The system of claim 15, wherein the signal metrics comprise a pilot signal strength value from the first satellite and a pilot signal strength value from the second satellite determined by a device configured to receive the signals from the first and second satellites.

17. The system of claim 15, wherein the gateway transceiver is configured to receive the signal metrics on a reverse link paging channel.

18. A ground station configured to operate in a satellite diversity system including a first satellite from a plurality of satellites having a first beam providing coverage for a first region and a second beam providing coverage for a second region, the first satellite configured as a primary satellite for the first region and a secondary satellite for the second region; a second satellite from the plurality of satellites having a first beam providing coverage for a third region that simultaneously substantially overlaps the first region and a second beam providing coverage for a fourth region that substantially overlaps the second region, the second satellite configured as a primary satellite for the fourth region and a secondary satellite for the third region;
 the ground station configured to:
  transmit a first forward link traffic signal to a first device in an overlapping portion of the first and third regions via the first satellite when a signal metric relating to the first forward traffic link signal reported by the first device is greater than a predetermined threshold;
  transmit the first forward link traffic signal to the first device via the second satellite when the signal metric is not greater than the predetermined threshold;
  direct the device to vary transmit power to maintain a reverse link signal with at least the first satellite and the second satellite from the plurality of satellites;
  receive at least a first reverse link signal from the first satellite and a second reverse link signal from the second satellite; and
  combine the first and second reverse link signals.

19. A method of providing satellite diversity, the method comprising:
 illuminating a first geographic region using a first beam of a plurality of beams from a first satellite of a plurality of satellites;
 simultaneously illuminating a second geographic region substantially overlapping the first geographic region using a first beam of a plurality of beams from a second satellite of the plurality of satellites;
 transmitting a forward link traffic signal to a device positioned in a first geographic region using the first beam of the first satellite;
 determining if a communication link from the first satellite to the device is degraded by receiving signal metrics relating to the forward link traffic signal from the device comparing at least one of the signal metrics to a predetermined threshold;
 determining the communication link is degraded if the at least one of the signal metrics does not exceed the predetermined threshold;
 transmitting the forward link traffic signal to the device using the first beam of the second satellite if the communication link from the first satellite is degraded;
 directing the device to vary transmit power to maintain a reverse link signal with at least the first satellite and the second satellite from the plurality of satellites;
 receiving at least a first reverse link signal from the first satellite and a second reverse link signal from the second satellite; and
 combining the first and second reverse link signals.

20. The method of claim 19, wherein the first satellite comprises a primary satellite for the first beam of the first plurality of beams and the second satellite comprises a secondary satellite for the first beam of the second plurality of beams.

21. The method of claim 19, wherein determining if the communication link is degraded comprises determining if the signal from the first satellite is faded.

22. The method of claim 19, wherein receiving signal metrics comprises; receiving a first satellite pilot signal strength value from the device; and receiving a second satellite pilot strength value from the device.

23. The method of claim 19, wherein comparing the at least one of the signal metrics to the predetermined threshold comprises comparing a received first satellite pilot strength value to the predetermined threshold.

24. The method of claim 19, wherein receiving signal metrics comprises receiving signal metrics from a device over a reverse link paging channel.

25. The method of claim 19 receiving signal metrics comprises: receiving a first reverse link signal from the first satellite; receiving a second reverse link signal from the second satellite; combining the first reverse link signal with the second reverse link signal to produce a combined reverse link signal; and determining the signal metrics from the combined reverse link signal.

26. A satellite diversity system comprising:
 means for transmitting a forward link traffic signal to a device positioned in a first geographic region using a first satellite from a plurality of satellites;
 means for receiving signal metrics relating to the forward link traffic signal from the device;
 means for comparing at least one of the signal metrics to a predetermined threshold; means for selecting an alternative signal path if the at least one signal metric is not greater than the predetermined threshold;
 means for transmitting the signal to the device using a second satellite from the plurality of satellites which simultaneously supports a region substantially overlapping the first geographic region if the alternative signal path is selected;
 means for directing the device to vary transmit power to maintain a reverse link signal with at least the first satellite and the second satellite from the plurality of satellites;
 means for receiving at least a first reverse link signal from the first satellite and a second reverse link signal from the second satellite; and
 means for combining the first and second reverse link signals.

27. A ground station employing code division multiple access (CDMA) configured for operation in a satellite diversity system including:
 a plurality of satellites including:
 a first satellite configured to simultaneously serve as a primary satellite for a first designated region and a secondary satellite for a second designated region, the first designated region being entirely distinct from the second designated region; and
 a second satellite configured to simultaneously serve as a primary satellite for the second designated region and a secondary satellite for the first designated region;
 the ground station configured to:
 transmit a forward link traffic signal to the first designated region via the first satellite during a period of time when a communication path through the first satellite is not degraded;
 transmit the forward link traffic signal to the first designated region via the second satellite during the period of time that the communication path through the first satellite is degraded;

receive signal metrics relating to the forward link traffic signal from a device and determine based at least in part on the signal metrics whether the communication path through first satellite is degraded;

direct a device to vary transmit power to maintain a reverse link signal with at least the first satellite and the second satellite from the plurality of satellites; and receive a first reverse link signal from the first satellite and a second reverse link signal from the second satellite, and configured to combine the first and second reverse link signals.

\* \* \* \* \*

UNITED STATES PATENT AND TRADEMARK OFFICE
CERTIFICATE OF CORRECTION

PATENT NO. : 7,639,646 B2  Page 1 of 1
APPLICATION NO. : 10/882964
DATED : December 29, 2009
INVENTOR(S) : Leonard N. Schiff It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Twenty-first Day of December, 2010

David J. Kappos
*Director of the United States Patent and Trademark Office*